United States Patent
Gupta et al.

(10) Patent No.: US 12,008,383 B2
(45) Date of Patent: Jun. 11, 2024

(54) HARDWARE DIRECTED CORE PARKING BASED ON PERFORMANCE AND ENERGY EFFICIENCY CAPABILITIES OF PROCESSING UNITS AND RUNTIME SYSTEM CHARACTERISTICS

(71) Applicant: Intel Corporation, Santa Clara, CA (US)

(72) Inventors: Monica Gupta, Hillsboro, OR (US); Stephen H. Gunther, Beaverton, OR (US); Russell Fenger, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 17/008,720

(22) Filed: Sep. 1, 2020

(65) Prior Publication Data

US 2022/0066788 A1   Mar. 3, 2022

(51) Int. Cl.
*G06F 9/4401* (2018.01)
*G06F 11/30* (2006.01)
*G06F 11/34* (2006.01)

(52) U.S. Cl.
CPC ........ *G06F 9/4418* (2013.01); *G06F 9/4405* (2013.01); *G06F 11/3024* (2013.01); *G06F 11/3428* (2013.01); *G06F 11/3466* (2013.01)

(58) Field of Classification Search
CPC ............ G06F 11/3024; G06F 11/3428; G06F 11/3466; G06F 9/4405; G06F 9/4418; Y02D 10/00
See application file for complete search history.

(56) References Cited

U.S. PATENT DOCUMENTS

| | | | |
|---|---|---|---|
| 7,389,403 B1 * | 6/2008 | Alpert | G06F 9/3851 712/10 |
| 9,811,389 B2 | 11/2017 | Rider et al. | |
| 9,910,481 B2 | 3/2018 | Lee et al. | |
| 10,037,227 B2 | 7/2018 | Therien et al. | |
| 10,073,718 B2 | 9/2018 | Therien et al. | |
| 10,324,519 B2 | 6/2019 | Weissmann et al. | |
| 10,503,542 B2 | 12/2019 | Therien et al. | |

(Continued)

OTHER PUBLICATIONS

International Patent Application No. PCT/US20/17277, entitled "Detection of Known Workload Patterns," filed Feb. 7, 2020, 34 pages.

(Continued)

*Primary Examiner* — Terrell S Johnson
(74) *Attorney, Agent, or Firm* — Nicholson De Vos Webster & Elliott LLP

(57) ABSTRACT

Systems, apparatuses and methods may provide for technology that automatically determines a runtime performance of a plurality of heterogeneous processing units based on system-level thread characteristics, wherein the runtime performance is determined on a per performance class basis. The technology may also automatically determine a runtime energy efficiency of the heterogeneous processing units, wherein the runtime energy efficiency is determined on a per efficiency class basis. In one example, technology selectively unparks one or more of the heterogeneous processing units based on the runtime performance and the runtime energy efficiency.

24 Claims, 8 Drawing Sheets

(56) References Cited

U.S. PATENT DOCUMENTS

| | | | |
|---|---|---|---|
| 10,545,793 | B2 | 1/2020 | Ananthakrishnan et al. |
| 2016/0217015 | A1* | 7/2016 | He ..................... G06F 9/5027 |
| 2018/0365022 | A1 | 12/2018 | Varma et al. |
| 2019/0041949 | A1 | 2/2019 | Al-Rawi et al. |
| 2019/0041950 | A1 | 2/2019 | Chynoweth et al. |
| 2019/0041962 | A1 | 2/2019 | Ananthakrishnan et al. |
| 2019/0042280 | A1* | 2/2019 | Shanbhogue ......... G06F 1/3206 |
| 2019/0079806 | A1 | 3/2019 | Ragland et al. |
| 2023/0205592 | A1* | 6/2023 | Ould-Ahmed-Vall ..................... G06F 9/4881 718/104 |

OTHER PUBLICATIONS

U.S. Appl. No. 16/554,940, entitled "System Apparatus And Method For Providing Hardware State Feedback To An Operating System in A Heterogeneous Processor," filed Aug. 29, 2019, 92 pages.
U.S. Appl. No. 16/728,617, entitled "Apparatus and Method for Adaptively Scheduling Work On Heterogeneous Processing Resources," filed Dec. 27, 2019, 114 pages.
"Intel® Architecture Instruction Set Extensions and Future Features Programming Reference," Intel Corporation, May 2018, 145 pages.

* cited by examiner ns and RuntimeYSTEM CHARACTERISTICS

HARDWARE DIRECTED CORE PARKING BASED ON PERFORMANCE AND ENERGY EFFICIENCY CAPABILITIES OF PROCESSING UNITS AND RUNTIME SYSTEM CHARACTERISTICS

TECHNICAL FIELD

Embodiments generally relate to computing architectures. More particularly, embodiments relate to hardware directed core parking based on performance and energy efficiency capabilities of processing units and runtime system characteristics.

BACKGROUND

Core parking in computing systems typically involves the process of deciding which processor cores (e.g., processing units) in a multi-core architecture to unpark (e.g., activate) and which processor cores to park (e.g., deactivate). Current core parking solutions may decide the core count and which cores to park/unpark based on utilization or concurrency, by assuming either that all processing units are homogeneous or that energy efficiency is static. Such assumptions, however, may be inaccurate in hybrid platforms (e.g., containing heterogeneous processing units). As a result, sub-optimal performance and/or efficiency may be experienced.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figures 1A, 1B:
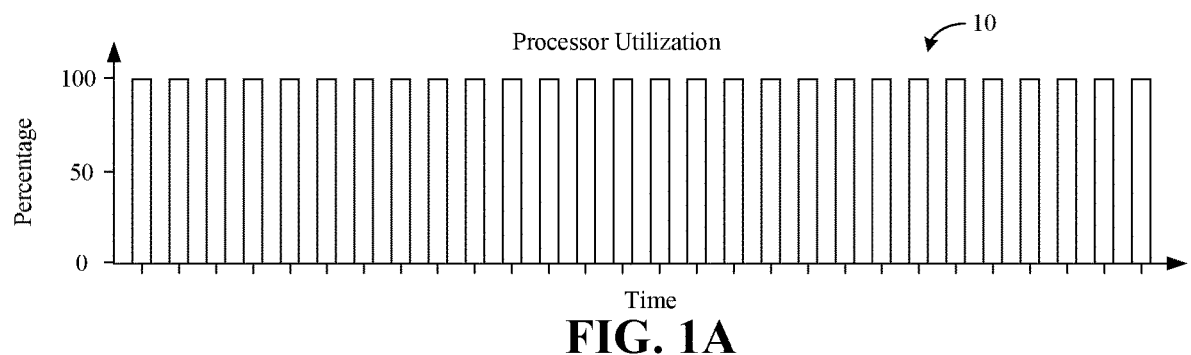
FIG. 1A is a plot of an example of processor utilization according to an embodiment.
FIG. 1B is an illustration of an example of a scheduling table according to an embodiment.

Turning now to FIG. 1A, a processor utilization chart 10 is shown in which processor utilization is relatively high (e.g., 100% over an extended period of time). The thread concurrency (e.g., parallel processing demand) may also be relatively high. In a multi-core architecture containing one or more cores (e.g., processing units, logical processors) that are "parked" (e.g., deactivated), the high processor utilization may trigger one or more cores to be "unparked" (e.g., activated). In one example, the unparking of one or more performant (e.g., high performance) cores may be particularly advantageous to deal with the illustrated high processor utilization condition/state.

With continuing reference to FIGS. 1A and 1B, a scheduling table 12 indicates that one group of processing units (Processor Numbers 0-3, e.g., Type A processing units such as INTEL ATOM processing units) may be classified in scheduling class "1", whereas another processing unit (Processor Number 4, e.g., Type B processing unit, such as an INTEL CORE processing unit) might be classified in scheduling class "0".

Figure 1C:
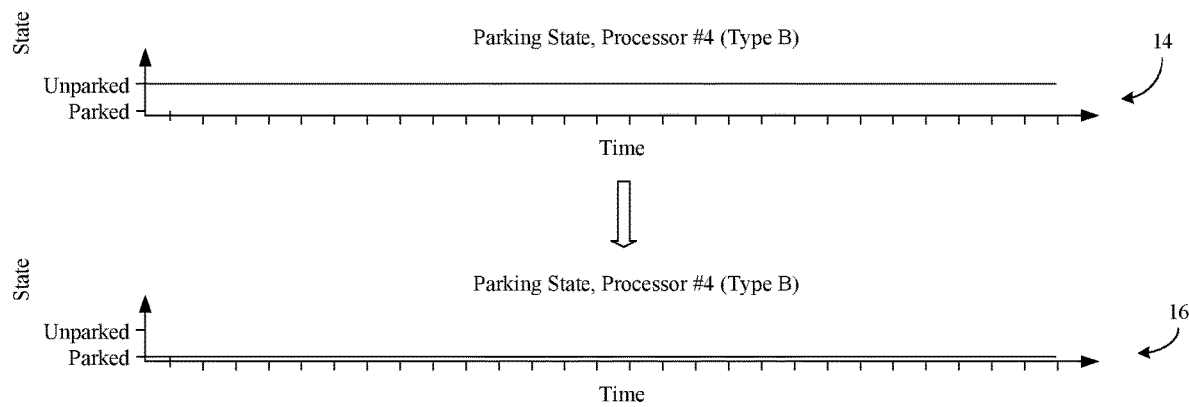
FIG. 1C is a comparative plot of an example of a conventional parking state and a parking state according to an embodiment.

With continuing reference to FIGS. 1A-1C, a conventional parking state plot 14 demonstrates that Processor Number 4 (e.g., the Type B processing unit) is unparked due to the high utilization and concurrency. Other system-level thread characteristics, however, such as power and/or thermal constraints, may result in the Type B processing unit being less performant than the Type A processing units (e.g., Processor Numbers 0-3). In such a case, an enhanced parking state plot 16 may indicate that the Type B processing unit is placed and/or maintained in the parked state during the high utilization and concurrency condition. As will be discussed in greater detail, by taking into consideration runtime thread characteristics, as well as the dynamic efficiency and performance of various processing units, embodiments are able to identify which cores to unpark for better efficiency and/or better performance.

Figure 2:
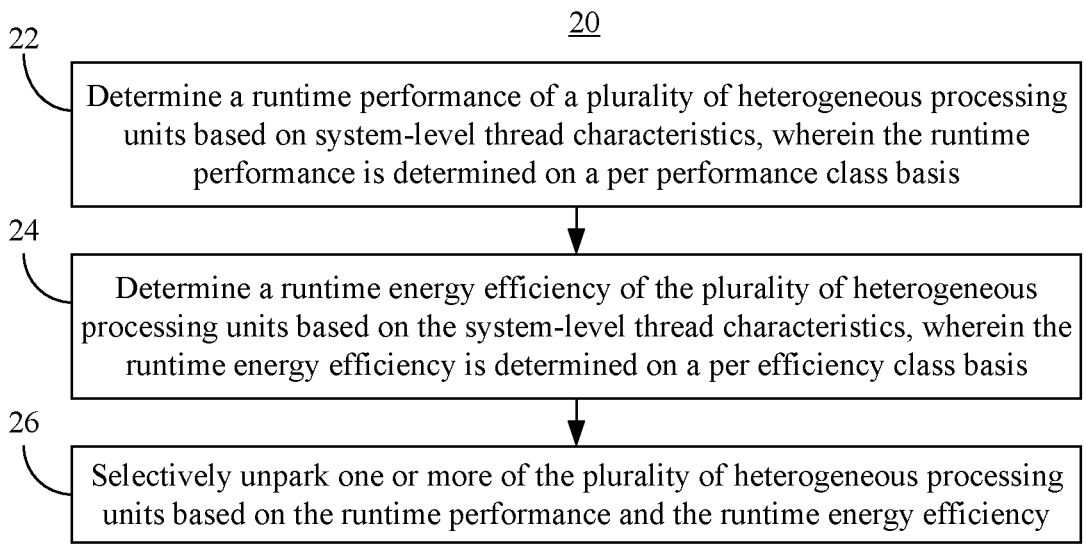
FIG. 2 is a flowchart of an example of a method of operating a performance and efficiency enhanced computing system according to an embodiment.

FIG. 2 shows a method 20 of operating a performance and efficiency enhanced computing system. The method 20 may be implemented in one or more modules as a set of logic instructions stored in a machine- or computer-readable storage medium such as random access memory (RAM), read-only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 20 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 22 provides for determining a runtime performance of a plurality of heterogeneous processing units based on system-level thread characteristics, wherein the runtime performance is determined on a per performance class basis. For example, the heterogenous processing units may be grouped in real-time into performance classes (e.g., Performance Class 0, Performance Class 1, etc.). Moreover, the runtime performance of each performance class may be determined based on system-level thread characteristics (e.g., power constraints, thermal constraints, quality of service/QoS, utilization, concurrency, thresholds, shared queue state, die location, etc.), which may be obtained from hardware (e.g., hardware counters via pcode) and/or software.

Block 24 determines a runtime energy efficiency of the plurality of heterogeneous processing units based on the system-level thread characteristics, wherein the runtime energy efficiency is determined on a per efficiency class basis. For example, the heterogeneous processing units may also be grouped in real-time into efficiency classes (e.g., Efficiency Class 0, Efficiency Class 1, etc.). Moreover, the runtime energy efficiency of each efficiency class may be determined based on the system-level thread characteristics (e.g., power constraints, thermal constraints, QoS, utilization, concurrency, thresholds, shared queue state, etc.), which may be obtained from hardware (e.g., hardware counters via pcode) and/or software.

Block 26 may selectively unpark one or more of the plurality of heterogeneous processing units based on the runtime performance and the runtime energy efficiency. For example, block 26 might determine that, due to system-level utilization conditions, three processing units in Performance Class 0 and one processing unit in Performance Class 1 will be unparked. In another example, block 26 may determine that, due to system-level power constraints, two processing units in Efficiency Class 0 and two processing units in Efficiency Class 1 will be unparked. Thus, the illustrated method 20 does not assume either that all processing units are homogeneous or that energy efficiency is static. Accordingly, accuracy is increased in hybrid platforms (e.g., containing heterogeneous processing units), which leads to more optimal performance and/or efficiency.

Figure 3:
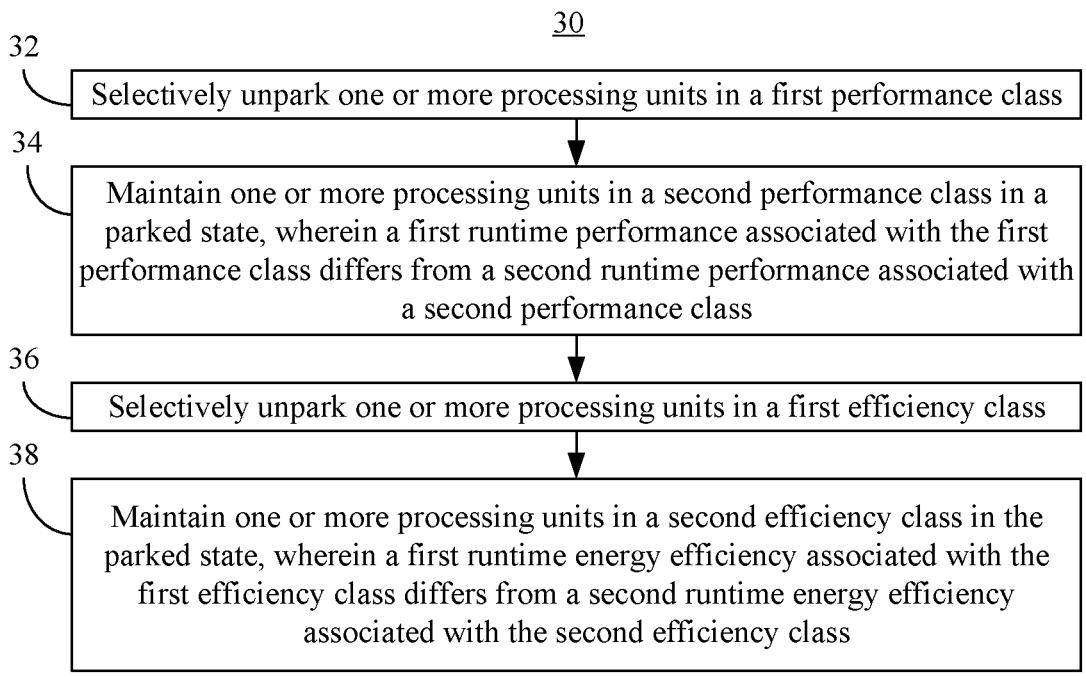
FIG. 3 is a flowchart of an example of a method of selectively unparking a plurality of heterogeneous processing units based on runtime performance and runtime energy efficiency according to an embodiment.

FIG. 3 is a flowchart of an example of a method 30 of selectively unparking a plurality of heterogeneous processing units based on runtime performance and runtime energy efficiency according to an embodiment. Illustrated processing block 32 provides for selectively unparking one or more processing units in a first performance class. Illustrated processing block 34 provides for maintaining one or more processing units in a second performance class in a parked state, where a first runtime performance associated with the first performance class differs from a second runtime performance associated with the second performance class. Illustrated processing block 36 provides for selectively unparking one or more processing units in a first efficiency class. Illustrated processing block 38 provides for maintaining one or more processing units in a second efficiency class in the parked state, where a first runtime energy efficiency associated with the first efficiency class differs from a second runtime energy efficiency associated with the second efficiency class.

Figure 4:
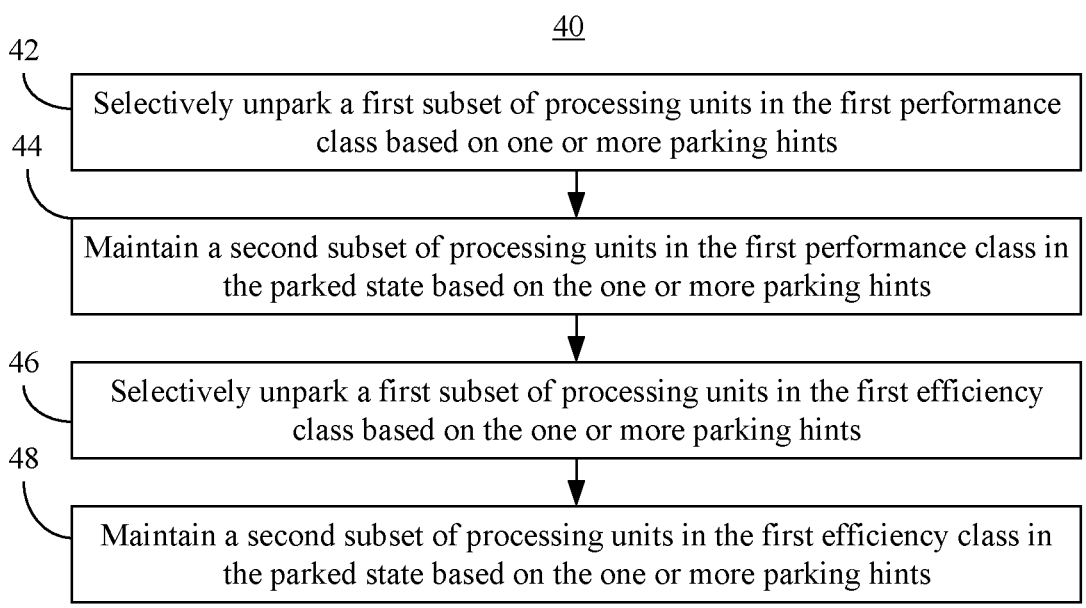
FIG. 4 is a flowchart of an example of a method of selectively unparking processing units within a class according to an embodiment.

FIG. 4 shows a method 40 of selectively unparking processing units in performance classes and efficiency classes. The method 40 may generally be incorporated into blocks 32 and/or 36 (FIG. 3), already discussed. More particularly, the method 40 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 42 provides for selectively unparking a first subset of processing units in the first performance class based on one or more parking hints. As will be discussed in greater detail, the parking hints are not limited to performance and energy efficiency capabilities, and may include system-wide parking hints based on any new capability added to hardware guided scheduling (HGS). Moreover, the parking hints may indicate a preference to unpark the next performant or energy efficient core by increasing a performance or energy efficiency delta between the subsequent processing units. Block 44 maintains a second subset of processing units in the first performance class in the parked state based on the parking hint(s). In an embodiment, block 46 selectively unparks a first subset of processing units in the first efficiency class based on the parking hint(s), where block 48 maintains a second subset of processing units in the first efficiency class in the parked state based on the parking hint(s). The illustrated method 40 further enhances performance and efficiency by enabling processing units within a class to be selectively parked.

Figure 5:
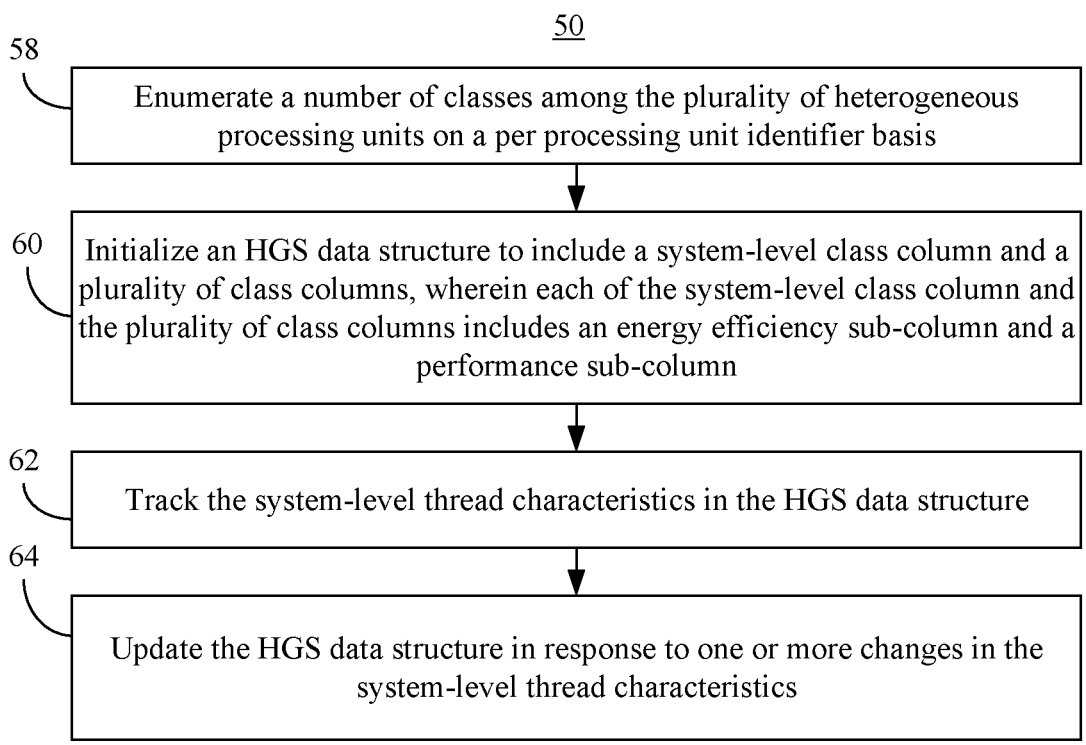
FIG. 5 is a flowchart of an example of a method of maintaining a hardware guided scheduling data structure according to an embodiment.
Figure 6:
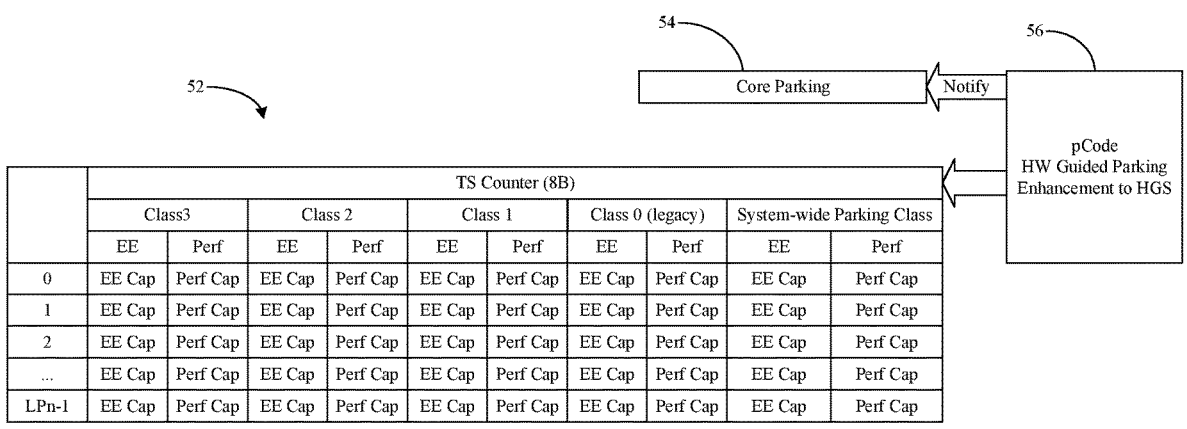
FIG. 6 is an illustration of an example of a hardware guided scheduling data structure according to an embodiment.

Turning now to FIGS. 5 and 6, a method 50 of maintaining an HGS data structure 52 is shown. In one example, the method 50 is conducted prior to and/or concurrently with the method 20 (FIG. 2), already discussed. The method 50 may generally be implemented at least partly in core parking logic 54 and/or pCode 56, already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 58 provides for enumerating a number of classes among the plurality of heterogeneous processing units on a per processing unit identifier (ID, e.g., CPUID) basis. Thus, block 58 may include determining how many performance classes and efficiency classes are available for a first processing unit, determining how many performance classes and efficiency classes are available for a second processing unit, and so forth. Support for the architecture of the HGS data structure 52 may be enabled via a model specific register (MSR) bit, such as the IA32_HW_FEEDBACK_CONFIG Read/Write package level scope (0x17D1) MSR bit 2. In an embodiment, following setting MSR bit 0, a legacy HGS table is built. In addition, when MSR bit 1 is set, HGS+ extension columns may be built. Moreover, when MSR bit 2 is set, a system-wide column may be updated for core parking assistance. In one example, when the ready IA32_PACKAGE_THERM_STATUS[26] bit is set, an interrupt is generated if the IA32_PACKAGE_THERM_INTERRUPT[25] bit is set. The interrupt may indicate that the HGS data structure 52 is ready to be initialized.

In an embodiment, block 60 initializes the HGS data structure 52 to include a system-level class column and a plurality of class columns, wherein each of the system-level class column and the plurality of class columns includes an energy efficiency sub-column and a performance sub-column. In one example, block 60 discovers the support via CPUID, discovers the number of classes based on CPUID, enables the support via IA32_HW_FEEDBACK_CONFIG bit 2, reads the HGS feedback memory parking column (rightmost system-wide column) to compute performance and energy efficiency classes to use when automatically deciding which cores to unpark.

Block 62 tracks the system-level thread characteristics in the HGS data structure 52. In one example, block 64 provides for updating the HGS data structure 52 in response to one or more changes in the system-level characteristics. Once notified, block 64 may update the performance and energy efficiency classes to use when automatically deciding which cores to unpark.

Figure 7:
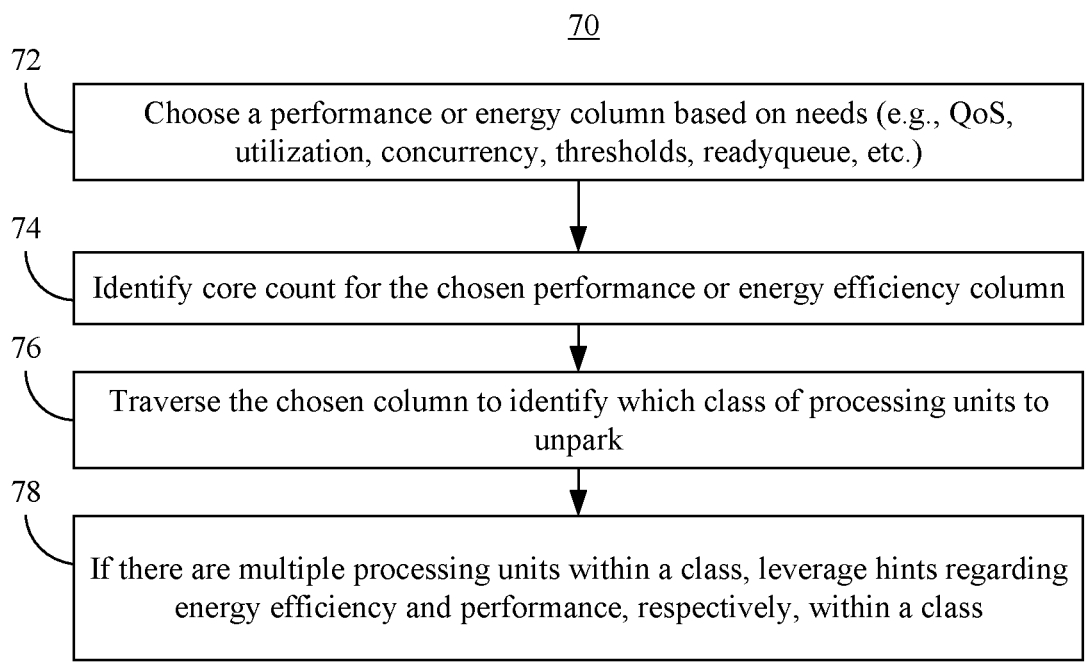
FIG. 7 is a flowchart of an example of a more detailed method of operating a performance and energy enhanced computing system according to an embodiment.

FIG. 7 shows a more detailed method 70 of operating a performance and efficiency enhanced computing system. The method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 72 chooses a performance or energy column based on needs such as, for example, QoS, utilization, concurrency, thresholds, shared queue status (e.g., readyqueue), etc. Block 74 identifies a core count for the chosen performance or energy efficiency column. In an embodiment, block 76 traverses the chosen column to identify which class of processing units to unpark. In one example, if there are multiple processing units within a class, block 78 leverages hints regarding energy efficiency and performance, respectively, within the class.

Updates

Returning to FIG. 6, the parking class may be computed by pCode 56 based on hardware heuristics such as a hardware counter, system constraints, etc. More particularly, the pCode 56 may provide hardware (HW) guided parking column updates in the following scenarios based on the system-wide dynamic characteristics.

The initial parking column may indicate a preference of processing units to be unparked for performance and energy efficiency capabilities based on system constraints. In an embodiment, the columns are updated in response to changes in that preference based on workload characteristics and how the system is running with respect to the performance/efficiency of the processing units. The columns may also be updated based on what would be the relative performance/energy efficiency if the workload is moved to other available processing units, assuming lesser performant or lesser efficient processing units are parked by the core parking logic 54.

Below are various use cases where the efficiency and performance capabilities are updated based on system-wide workload characteristics and what would be the performance energy efficiency of processing units if the current work moves to the unused processing units.

Utilization<Threshold, =>Perf[Type B]>Perf[Type A], and Eff[Type B]>Eff[Type A]:

Use case #1—low utilization running higher scaling threads; and

Use case #2—frequency above cross-over.

Utilization>Threshold, =>Perf[Type A]>Perf[Type B], and Eff[Type A]>Eff[Type B]:

Use case #3—sustained workload; and

Use case #4—lower TDP (thermal design power).

LowQoS Utilization, Perf[Type B]>Perf[Type A], and Eff[Type B]>Eff[Type A]:

Use case #5—low QoS running higher scaling threads.

Hints

As already noted, the hints are not limited to performance and energy efficiency capabilities. For example, the hints may include system-wide parking hints based on any new capability added to HGS. With regard to relative parking capabilities, the parking hints may also indicate a preference to unpark the next performant or energy efficient core by increasing the performance or energy efficiency delta between the subsequent processing units (e.g., logical processors/LPs).

For example:

LP0—Unparked
LP1—Parked
LP2—Parked
LP3—Parked

If the energy efficiency penalty is twice as much to unpark LP2/LP3 versus LP1 next, then the above may be indicated via relative energy efficiency capability difference.

The below example represents an example of energy efficiency capabilities that reflect this difference when LP0 is unparked, and rest of the LPs are parked. Also, If the energy efficiency penalty to unpark LP3 once LP2 is unparked is negligible, then if LP2 is unparked, the energy efficiency capabilities might be updated to reflect the same as:

LP0=100
LP1=150
LP2=250
LP3=250

Figure 8:
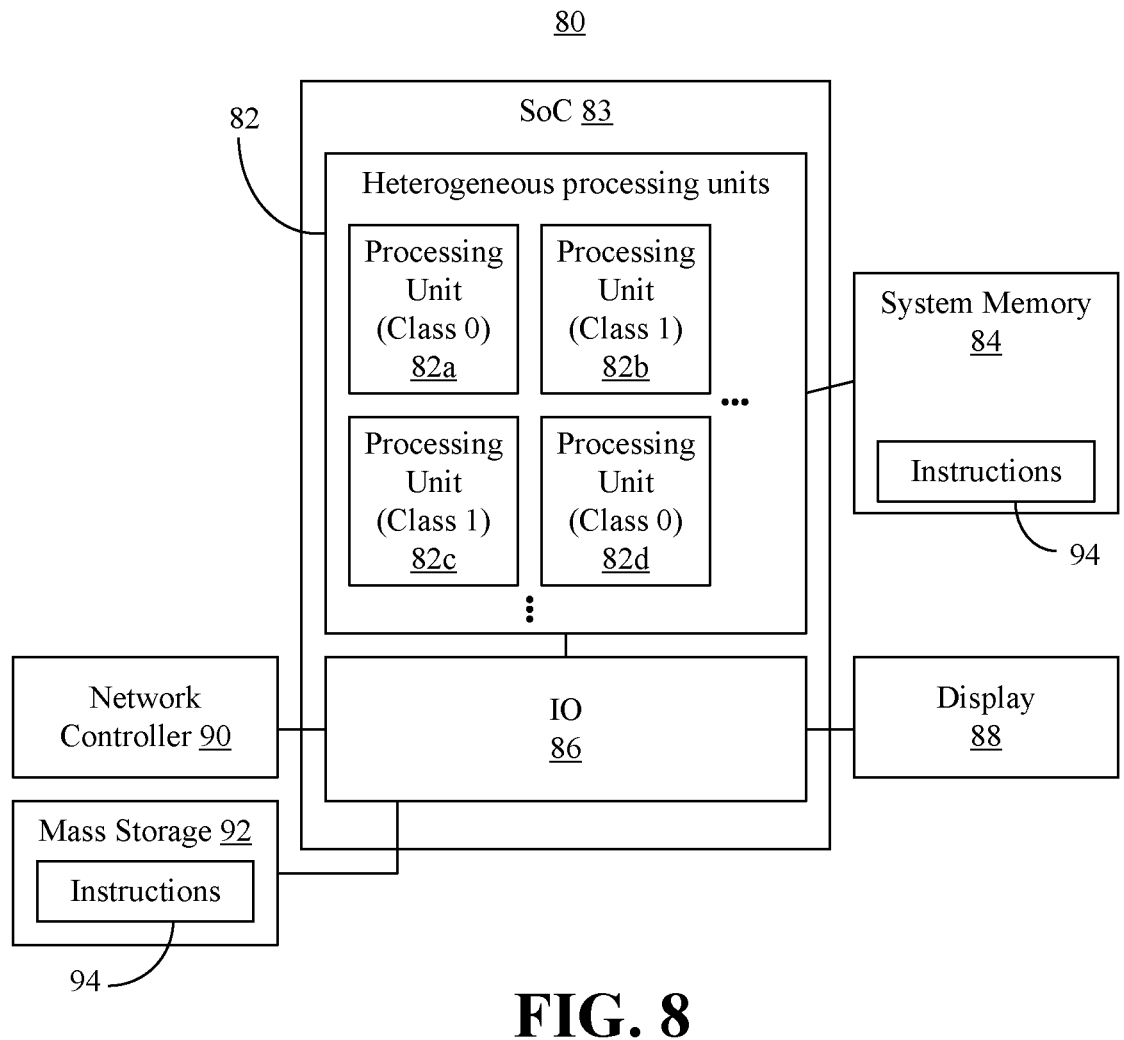
FIG. 8 is a block diagram of an example of a performance and efficiency enhanced computing system according to an embodiment.

FIG. 8 shows a computing system 80 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), drone functionality, robotic functionality (e.g., autonomous robot), Internet of Things (IoT) functionality, etc., or any combination thereof. In the illustrated example, the system 80 includes a plurality of heterogeneous processing units 82 (82a-82d, e.g., including host processors, graphics processors, etc.) that are coupled (e.g., via a memory controller, not shown) to a system memory 84 (e.g., dual inline memory module/DIMM).

The illustrated system 80 also includes an input output (1O) module 86 that is integrated with the heterogeneous processing units 82 into a hybrid system on chip (SoC) 83. In an embodiment, the IO module 86 communicates with a display 88 (e.g., touch screen, liquid crystal display/LCD, light emitting diode/LED display), a network controller 90 (e.g., wired and/or wireless), and mass storage 92 (e.g., hard disk drive/HDD, optical disk, solid state drive/SSD, flash memory). The system memory 84 and/or mass storage 92 include a set of executable program instructions 94, which when executed by at least one processing unit such as, for example, one of the plurality of heterogeneous processing units 82, a power and/or performance controller (not shown, e.g., on the SoC 83 or on a separate chip), etc., cause the computing system 80 and/or the at least one processing unit to perform one or more aspects of the method 20 (FIG. 2), the method 30 (FIG. 3), the method 40 (FIG. 4), the method 50 (FIG. 5) and/or the method 70 (FIG. 7), already discussed.

Thus, execution of the instructions 94 may cause the computing system 80 and/or the at least one processing unit to determine a runtime performance of the heterogeneous processing units 82 based on system-level thread characteristics, wherein the runtime performance is determined on a per performance class basis. In an embodiment, execution of the instructions 94 also causes the computing system 80 and/or the at least one processing unit to determine a runtime energy efficiency of the heterogeneous processing units 82, wherein the runtime energy efficiency is determined on a per efficiency class basis. In one example, execution of the instructions 94 also causes the computing system 80 and/or the at least one processing unit to selectively unpark one or more of the heterogeneous processing units 82 based on the runtime performance and the runtime energy efficiency.

The computing system 80 is therefore performance and efficiency enhanced at least to the extent that the computing system 80 does not assume either that all processing units are homogeneous or that energy efficiency is static. Accordingly, parking accuracy is increased, which leads to more optimal performance and/or efficiency.

Figure 9:
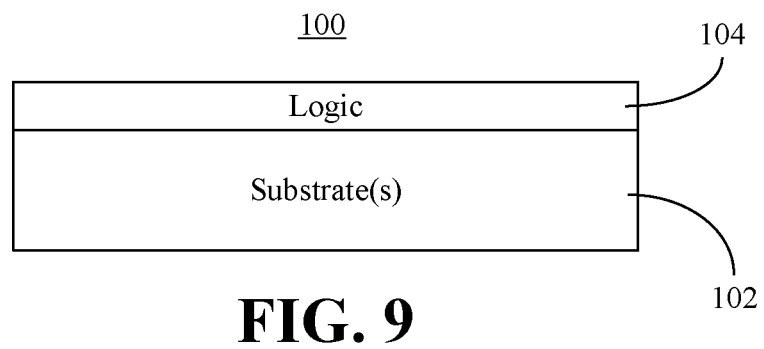
FIG. 9 is an illustration of an example of a semiconductor apparatus according to an embodiment.

FIG. 9 shows a semiconductor package apparatus 100. The illustrated apparatus 100 includes one or more substrates 102 (e.g., silicon, sapphire, gallium arsenide) and logic 104 (e.g., transistor array and other integrated circuit/IC components) coupled to the substrate(s) 102. The logic 104 may be implemented at least partly in configurable logic or fixed-functionality hardware logic. Additionally, the logic 104 may generally implement one or more aspects of the method 20 (FIG. 2), the method 30 (FIG. 3), the method 40 (FIG. 4), the method 50 (FIG. 5) and/or the method 70 (FIG. 7), already discussed. Thus, the logic 104 may automatically determine a runtime performance of a plurality of heterogeneous processing units based on system-level thread characteristics, wherein the runtime performance is determined on a per performance class basis. In an embodiment, the logic 104 also automatically determines a runtime energy efficiency of the heterogeneous processing units, wherein the runtime energy efficiency is determined on a per efficiency class basis. In one example, the logic 104 selectively unparks one or more of the heterogeneous processing units based on the runtime performance and the runtime energy efficiency.

Thus, the apparatus 100 is performance and efficiency enhanced at least to the extent that the logic 104 does not assume either that all processing units are homogeneous or that energy efficiency is static. Accordingly, parking accuracy is increased, which leads to more optimal performance and/or efficiency.

In one example, the logic 104 includes transistor channel regions that are positioned (e.g., embedded) within the substrate(s) 102. Thus, the interface between the logic 104 and the substrate(s) 102 may not be an abrupt junction. The logic 104 may also be considered to include an epitaxial layer that is grown on an initial wafer of the substrate(s) 102.

Additional Notes and Examples

Example 1 includes a performance and efficiency enhanced computing system comprising a plurality of heterogeneous processing units, and a memory coupled to at least one of the processing units, wherein the memory includes a set of instructions, which when executed by the at least one processing unit, cause the at least one processing unit to determine a runtime performance of the plurality of heterogeneous processing units based on system-level thread characteristics, wherein the runtime performance is determined on a per performance class basis, determine a runtime energy efficiency of the plurality of heterogeneous processing units based on the system-level thread characteristics, wherein the runtime energy efficiency is determined on a per efficiency class basis, and selectively unpark one or more of the plurality of heterogeneous processing units based on the runtime performance and the runtime energy efficiency.

Example 2 includes the computing system of Example 1, wherein to selectively unpark one or more of the plurality of heterogeneous processing units, the instructions, when executed, cause the at least one processing unit to selectively unpark one or more processing units in a first performance class, maintain one or more processing units in a second performance class in a parked state, wherein a first runtime performance associated with the first performance class is to differ from a second runtime performance associated with the second performance class, selectively unpark one or more processing units in a first efficiency class, and maintain one or more processing units in a second efficiency class in the parked state, wherein a first runtime energy efficiency associated with the first efficiency class is to differ from a second runtime energy efficiency associated with the second efficiency class.

Example 3 includes the computing system of Example 2, wherein to selectively unpark one or more processing units in the first class, the instructions, when executed, cause the at least one processing unit to selectively unpark a first subset of processing units in the first performance class based on one or more parking hints, maintain a second subset of processing units in the first performance class in the parked state based on the one or more parking hints, selectively unpark a first subset of processing units in the first efficiency class based on the one or more parking hints, and maintain a second subset of processing units in the first efficiency class in the parked state based on the one or more parking hints.

Example 4 includes the computing system of Example 1, wherein the instructions, when executed, further cause the at least one processing unit to track the system-level thread characteristics in a hardware guided scheduling (HGS) data structure, and update the HGS data structure in response to one or more changes in the system-level thread characteristics.

Example 5 includes the computing system of Example 4, wherein the instructions, when executed, further cause the at least one processing unit to initialize the HGS data structure to include a system-level class column and a plurality of class columns, wherein each of the system-level class column and the plurality of class columns is to include an energy efficiency sub-column and a performance sub-column.

Example 6 includes the computing system of any one of Examples 1 to 5, wherein the instructions, when executed, further cause the at least one processing unit to enumerate a number of classes among the plurality of heterogeneous processing units on a per processing unit identifier basis.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine a runtime performance of a plurality of heterogeneous processing units based on system-level thread characteristics, wherein the runtime performance is determined on a per performance class basis, determine a runtime energy efficiency of the plurality of heterogeneous processing units based on the system-level thread characteristics, wherein the runtime energy efficiency is determined on a per efficiency class basis, and selectively unpark one or more of the plurality of heterogeneous processing units based on the runtime performance and the runtime energy efficiency.

Example 8 includes the apparatus of Example 7, wherein to selectively unpark one or more of the plurality of heterogeneous processing units, the logic coupled to the one or more substrates is to selectively unpark one or more processing units in a first performance class, maintain one or more processing units in a second performance class in a parked state, wherein a first runtime performance associated with the first performance class is to differ from a second runtime performance associated with the second performance class, selectively unpark one or more processing units in a first efficiency class, and maintain one or more processing units in a second efficiency class in the parked state, wherein a first runtime energy efficiency associated with the first efficiency class is to differ from a second runtime energy efficiency associated with the second efficiency class.

Example 9 includes the apparatus of Example 8, wherein to selectively unpark one or more processing units in the first class, the logic coupled to the one or more substrates is to selectively unpark a first subset of processing units in the first performance class based on one or more parking hints, maintain a second subset of processing units in the first performance class in the parked state based on the one or more parking hints, selectively unpark a first subset of processing units in the first efficiency class based on the one or more parking hints, and maintain a second subset of processing units in the first efficiency class in the parked state based on the one or more parking hints.

Example 10 includes the apparatus of Example 7, wherein the logic coupled to the one or more substrates is to track the system-level thread characteristics in a hardware guided scheduling (HGS) data structure, and update the HGS data structure in response to one or more changes in the system-level thread characteristics.

Example 11 includes the apparatus of Example 10, wherein the logic coupled to the one or more substrates is to initialize the HGS data structure to include a system-level class column and a plurality of class columns, wherein each of the system-level class column and the plurality of class columns is to include an energy efficiency sub-column and a performance sub-column.

Example 12 includes the apparatus of any one of Examples 7 to 11, wherein the logic coupled to the one or more substrates is to enumerate a number of classes among the plurality of heterogeneous processing units on a per processing unit identifier basis.

Example 13 includes at least one computer readable storage medium comprising a set of instructions, which when executed by a computing system, cause the computing system to determine a runtime performance of a plurality of heterogeneous processing units based on system-level thread characteristics, wherein the runtime performance is determined on a per performance class basis, determine a runtime energy efficiency of the plurality of heterogeneous processing units based on the system-level thread characteristics, wherein the runtime energy efficiency is determined on a per efficiency class basis, and selectively unpark one or more of the plurality of heterogeneous processing units based on the runtime performance and the runtime energy efficiency.

Example 14 includes the at least one computer readable storage medium of Example 13, wherein to selectively unpark one or more of the plurality of heterogeneous processing units, the instructions, when executed, cause the computing system to selectively unpark one or more processing units in a first performance class, maintain one or more processing units in a second performance class in a parked state, wherein a first runtime performance associated with the first performance class is to differ from a second runtime performance associated with the second performance class, selectively unpark one or more processing units in a first efficiency class, and maintain one or more processing units in a second efficiency class in the parked state, wherein a first runtime energy efficiency associated with the first efficiency class is to differ from a second runtime energy efficiency associated with the second efficiency class.

Example 15 includes the at least one computer readable storage medium of Example 14, wherein to selectively unpark one or more processing units in the first class, the instructions, when executed, cause the computing system to selectively unpark a first subset of processing units in the first performance class based on one or more parking hints, maintain a second subset of processing units in the first performance class in the parked state based on the one or more parking hints, selectively unpark a first subset of processing units in the first efficiency class based on the one or more parking hints, and maintain a second subset of processing units in the first efficiency class in the parked state based on the one or more parking hints.

Example 16 includes the at least one computer readable storage medium of Example 13, wherein the instructions, when executed, further cause the computing system to track the system-level thread characteristics in a hardware guided scheduling (HGS) data structure, and update the HGS data structure in response to one or more changes in the system-level thread characteristics.

Example 17 includes the at least one computer readable storage medium of Example 16, wherein the instructions, when executed, further cause the computing system to initialize the HGS data structure to include a system-level class column and a plurality of class columns, wherein each of the system-level class column and the plurality of class columns is to include an energy efficiency sub-column and a performance sub-column.

Example 18 includes the at least one computer readable storage medium of any one of Examples 13 to 17, wherein the instructions, when executed, further cause the computing system to enumerate a number of classes among the plurality of heterogeneous processing units on a per processing unit identifier basis.

Example 19 includes a method of operating a performance and efficiency enhanced computing system, the method comprising determining a runtime performance of a plurality of heterogeneous processing units based on system-level thread characteristics, wherein the runtime performance is determined on a per performance class basis, determining a runtime energy efficiency of the plurality of heterogeneous processing units based on the system-level thread characteristics, wherein the runtime energy efficiency is determined on a per efficiency class basis, and selectively unparking one or more of the plurality of heterogeneous processing units based on the runtime performance and the runtime energy efficiency.

Example 20 includes the method of Example 19, wherein selectively unparking one or more of the plurality of heterogeneous processing units includes selectively unparking one or more processing units in a first performance class, maintaining one or more processing units in a second performance class in a parked state, wherein a first runtime performance associated with the first performance class differs from a second runtime performance associated with the second performance class, selectively unparking one or more processing units in a first efficiency class, and maintaining one or more processing units in a second efficiency class in the parked state, wherein a first runtime energy efficiency associated with the first efficiency class differs from a second runtime energy efficiency associated with the second efficiency class.

Example 21 includes the method of Example 20, wherein selectively unparking one or more processing units in the first class includes selectively unparking a first subset of processing units in the first performance class based on one or more parking hints, maintaining a second subset of processing units in the first performance class in the parked state based on the one or more parking hints, selectively unparking a first subset of processing units in the first efficiency class based on the one or more parking hints, and maintaining a second subset of processing units in the first efficiency class in the parked state based on the one or more parking hints.

Example 22 includes the method of Example 19, further including tracking the system-level thread characteristics in a hardware guided scheduling (HGS) data structure, and updating the HGS data structure in response to one or more changes in the system-level thread characteristics.

Example 23 includes the method of Example 22, further including initializing the HGS data structure to include a system-level class column and a plurality of class columns, wherein each of the system-level class column and the plurality of class columns includes an energy efficiency sub-column and a performance sub-column.

Example 24 includes the method of any one of Examples 19 to 23, further including enumerating a number of classes among the plurality of heterogeneous processing units on a per processing unit identifier basis.

Example 25 includes means for performing the method of any one of Examples 19 to 24.

Thus, based on cross-over frequencies (e.g., the frequencies at which the performance or efficiency changes across different processing units), some processing units might be more efficient than other processing units. The core parking technology described herein may leverage this dynamic system-wide efficiency for optimal efficient cores when parking/unparking based on efficiency. For example, when the operating frequency of a core is above a cross-over threshold, one core may be more efficient than another core in a hybrid platform.

Based on thread-characteristics, higher scaling threads on one type of processing unit (e.g., Type B) versus another type of processing unit (e.g., Type A) may be more efficient on Type B processing units versus Type A processing units. Technology described herein leverages a system-wide view of thread composition to guide the parking logic to identify which processing units will be more efficient than other processing units.

The technology may also leverage other runtime characteristics such as the placement of various processing units on the die. More particularly, the technology uses relative performance and energy efficiency differences known by hardware to influence how quickly to park or unpark additional processing units. This approach may be based on location of the processing units (e.g., with respect to each other or other resources such as cache, memory, die, module, surface mount technology/SMT sibling, etc.), instruction set architecture (ISA) differences, in-die variations, thermal response, etc.

Similarly, for performance requirements, based on cross-over/thread characteristic, etc., the system-wide view may help identify which processing units are more performant than others. Based on concurrency, the system-wide view also detects the combination of processing units to guide the parking logic to identify which processing units will be more performant and which processing units will be more efficient.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a plurality of heterogeneous processing units; and
a memory coupled to at least one of the processing units, wherein the memory includes a set of instructions, which when executed by the at least one processing unit, causes the at least one processing unit to:
determine a runtime performance of the plurality of heterogeneous processing units based on system-level thread characteristics, wherein the runtime performance is determined on a per performance class basis,
determine a runtime energy efficiency of the plurality of heterogeneous processing units based on the system-level thread characteristics, wherein the runtime energy efficiency is determined on a per efficiency class basis, and
selectively unpark one or more of the plurality of heterogeneous processing units based on the runtime performance and the runtime energy efficiency,
wherein to selectively unpark one or more of the plurality of heterogeneous processing units based on the runtime performance, the instructions, when executed, cause the at least one processing unit to:
selectively unpark one or more processing units in a first performance class, and
maintain one or more processing units in a second performance class in a parked state, wherein a first runtime performance associated with the first performance class is to differ from a second runtime performance associated with the second performance class,
wherein to selectively unpark one or more processing units in the first performance class, the instructions, when executed, cause the at least one processing unit to:
selectively unpark a first subset of processing units in the first performance class based on one or more parking hints, and
maintain a second subset of processing units in the first performance class in the parked state based on the one or more parking hints,
wherein the one or more parking hints include a preference to unpark a next performant core by increasing a performance delta between subsequent processing units.

2. The computing system of claim 1, wherein to selectively unpark one or more of the plurality of heterogeneous processing units based on the runtime energy efficiency, the instructions, when executed, cause the at least one processing unit to:
selectively unpark one or more processing units in a first efficiency class, and
maintain one or more processing units in a second efficiency class in the parked state, wherein a first runtime energy efficiency associated with the first efficiency class is to differ from a second runtime energy efficiency associated with the second efficiency class.

3. The computing system of claim 2, wherein to selectively unpark one or more processing units in the first efficiency class, the instructions, when executed, cause the at least one processing unit to:
selectively unpark a first subset of processing units in the first efficiency class based on the one or more parking hints, and
maintain a second subset of processing units in the first efficiency class in the parked state based on the one or more parking hints,
wherein the one or more parking hints include a preference to unpark a next energy efficient core by increasing an energy efficiency delta between subsequent processing units.

4. The computing system of claim 1, wherein the instructions, when executed, further cause the at least one processing unit to:
track the system-level thread characteristics in a hardware guided scheduling (HGS) data structure, and
update the HGS data structure in response to one or more changes in the system-level thread characteristics.

5. The computing system of claim 4, wherein the instructions, when executed, further cause the at least one processing unit to initialize the HGS data structure to include a system-level class column and a plurality of class columns, wherein each of the system-level class column and the plurality of class columns is to include an energy efficiency sub-column and a performance sub-column.

6. The computing system of claim 1, wherein the instructions, when executed, further cause the at least one processing unit to enumerate a number of classes among the plurality of heterogeneous processing units on a per processing unit identifier basis.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
determine a runtime performance of a plurality of heterogeneous processing units based on system-level thread characteristics, wherein the runtime performance is determined on a per performance class basis;
determine a runtime energy efficiency of the plurality of heterogeneous processing units based on the system-level thread characteristics, wherein the runtime energy efficiency is determined on a per efficiency class basis; and
selectively unpark one or more of the plurality of heterogeneous processing units based on the runtime performance and the runtime energy efficiency,
wherein to selectively unpark one or more of the plurality of heterogeneous processing units based on the runtime performance, the logic coupled to the one or more substrates is to:
selectively unpark one or more processing units in a first performance class, and
maintain one or more processing units in a second performance class in a parked state, wherein a first runtime performance associated with the first performance class is to differ from a second runtime performance associated with the second performance class, wherein to selectively unpark one or more processing units in the first performance class, the logic coupled to the one or more substrates is to:
  selectively unpark a first subset of processing units in the first performance class based on one or more parking hints, and
  maintain a second subset of processing units in the first performance class in the parked state based on the one or more parking hints,
wherein the one or more parking hints include a preference to unpark a next performant core by increasing a performance delta between subsequent processing units.

8. The apparatus of claim 7, wherein to selectively unpark one or more of the plurality of heterogeneous processing units based on the runtime energy efficiency, the logic coupled to the one or more substrates is to:
  selectively unpark one or more processing units in a first efficiency class; and
  maintain one or more processing units in a second efficiency class in the parked state, wherein a first runtime energy efficiency associated with the first efficiency class is to differ from a second runtime energy efficiency associated with the second efficiency class.

9. The apparatus of claim 8, wherein to selectively unpark one or more processing units in the first efficiency class, the logic coupled to the one or more substrates is to:
  selectively unpark a first subset of processing units in the first efficiency class based on the one or more parking hints; and
  maintain a second subset of processing units in the first efficiency class in the parked state based on the one or more parking hints,
  wherein the one or more parking hints include a preference to unpark a next energy efficient core by increasing an energy efficiency delta between subsequent processing units.

10. The apparatus of claim 7, wherein the logic coupled to the one or more substrates is to:
  track the system-level thread characteristics in a hardware guided scheduling (HGS) data structure; and
  update the HGS data structure in response to one or more changes in the system-level thread characteristics.

11. The apparatus of claim 10, wherein the logic coupled to the one or more substrates is to initialize the HGS data structure to include a system-level class column and a plurality of class columns, wherein each of the system-level class column and the plurality of class columns is to include an energy efficiency sub-column and a performance sub-column.

12. The apparatus of claim 7, wherein the logic coupled to the one or more substrates is to enumerate a number of classes among the plurality of heterogeneous processing units on a per processing unit identifier basis.

13. At least one non-transitory computer readable storage medium comprising a set of instructions, which when executed by a computing system, cause the computing system to:
  determine a runtime performance of a plurality of heterogeneous processing units based on system-level thread characteristics, wherein the runtime performance is determined on a per performance class basis;
  determine a runtime energy efficiency of the plurality of heterogeneous processing units based on the system-level thread characteristics, wherein the runtime energy efficiency is determined on a per efficiency class basis; and
  selectively unpark one or more of the plurality of heterogeneous processing units based on the runtime performance and the runtime energy efficiency,
wherein to selectively unpark one or more of the plurality of heterogeneous processing units based on the runtime performance, the instructions, when executed, cause the computing system to:
  selectively unpark one or more processing units in a first performance class, and
  maintain one or more processing units in a second performance class in a parked state, wherein a first runtime performance associated with the first performance class is to differ from a second runtime performance associated with the second performance class,
wherein to selectively unpark one or more processing units in the first performance class, the instructions, when executed, cause the computing system to:
  selectively unpark a first subset of processing units in the first performance class based on one or more parking hints, and
  maintain a second subset of processing units in the first performance class in the parked state based on the one or more parking hints,
wherein the one or more parking hints include a preference to unpark a next performant core by increasing a performance delta between subsequent processing units.

14. The at least one non-transitory computer readable storage medium of claim 13, wherein to selectively unpark one or more of the plurality of heterogeneous processing units based on the runtime energy efficiency, the instructions, when executed, cause the computing system to:
  selectively unpark one or more processing units in a first efficiency class; and
  maintain one or more processing units in a second efficiency class in the parked state, wherein a first runtime energy efficiency associated with the first efficiency class is to differ from a second runtime energy efficiency associated with the second efficiency class.

15. The at least one non-transitory computer readable storage medium of claim 14, wherein to selectively unpark one or more processing units in the first efficiency class, the instructions, when executed, cause the computing system to:
  selectively unpark a first subset of processing units in the first efficiency class based on the one or more parking hints; and
  maintain a second subset of processing units in the first efficiency class in the parked state based on the one or more parking hints,
  wherein the one or more parking hints include a preference to unpark a next energy efficient core by increasing an energy efficiency delta between subsequent processing units.

16. The at least one non-transitory computer readable storage medium of claim 13, wherein the instructions, when executed, further cause the computing system to:
  track the system-level thread characteristics in a hardware guided scheduling (HGS) data structure; and
  update the HGS data structure in response to one or more changes in the system-level thread characteristics.

17. The at least one non-transitory computer readable storage medium of claim 16, wherein the instructions, when executed, further cause the computing system to initialize the HGS data structure to include a system-level class column and a plurality of class columns, wherein each of the system-level class column and the plurality of class columns is to include an energy efficiency sub-column and a performance sub-column.

18. The at least one non-transitory computer readable storage medium of claim 13, wherein the instructions, when executed, further cause the computing system to enumerate a number of classes among the plurality of heterogeneous processing units on a per processing unit identifier basis.

19. A method comprising:
determining a runtime performance of a plurality of heterogeneous processing units based on system-level thread characteristics, wherein the runtime performance is determined on a per performance class basis;
determining a runtime energy efficiency of the plurality of heterogeneous processing units based on the system-level thread characteristics, wherein the runtime energy efficiency is determined on a per efficiency class basis; and
selectively unparking one or more of the plurality of heterogeneous processing units based on the runtime performance and the runtime energy efficiency,
wherein selectively unparking one or more of the plurality of heterogeneous processing units based on the runtime performance includes:
selectively unparking one or more processing units in a first performance class, and
maintaining one or more processing units in a second performance class in a parked state, wherein a first runtime performance associated with the first performance class differs from a second runtime performance associated with the second performance class,
wherein selectively unparking one or more processing units in the first performance class includes:
selectively unparking a first subset of processing units in the first performance class based on one or more parking hints, and
maintaining a second subset of processing units in the first performance class in the parked state based on the one or more parking hints,
wherein the one or more parking hints include a preference to unpark a next performant core by increasing a performance delta between subsequent processing units.

20. The method of claim 19, wherein selectively unparking one or more of the plurality of heterogeneous processing units based on the runtime energy efficiency includes:
selectively unparking one or more processing units in a first efficiency class; and
maintaining one or more processing units in a second efficiency class in the parked state, wherein a first runtime energy efficiency associated with the first efficiency class differs from a second runtime energy efficiency associated with the second efficiency class.

21. The method of claim 20, wherein selectively unparking one or more processing units in the first efficiency class includes:
selectively unparking a first subset of processing units in the first efficiency class based on the one or more parking hints; and
maintaining a second subset of processing units in the first efficiency class in the parked state based on the one or more parking hints,
wherein the one or more parking hints include a preference to unpark a next energy efficient core by increasing an energy efficiency delta between subsequent processing units.

22. The method of claim 19, further including:
tracking the system-level thread characteristics in a hardware guided scheduling (HGS) data structure; and
updating the HGS data structure in response to one or more changes in the system-level thread characteristics.

23. The method of claim 22, further including initializing the HGS data structure to include a system-level class column and a plurality of class columns, wherein each of the system-level class column and the plurality of class columns includes an energy efficiency sub-column and a performance sub-column.

24. The method of claim 19, further including enumerating a number of classes among the plurality of heterogeneous processing units on a per processing unit identifier basis.

* * * * *